US012266305B2

(12) United States Patent
Kim et al.

(10) Patent No.: US 12,266,305 B2
(45) Date of Patent: Apr. 1, 2025

(54) HIGH SPEED PIXEL CIRCUIT FOR ORGANIC LIGHT EMITTING DIODE (OLED) DISPLAY

(71) Applicant: Meta Platforms Technologies, LLC, Menlo Park, CA (US)

(72) Inventors: Gyungmin Kim, Santa Clara, CA (US); Min Hyuk Choi, San Jose, CA (US); Takanori Shibasaki, Cupertino, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 91 days.

(21) Appl. No.: 18/122,619

(22) Filed: Mar. 16, 2023

(65) Prior Publication Data

US 2023/0317006 A1 Oct. 5, 2023

Related U.S. Application Data

(60) Provisional application No. 63/326,645, filed on Apr. 1, 2022.

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01);
(Continued)

(58) Field of Classification Search
CPC .. G09G 3/3233; G09G 3/3208; G09G 3/3225; G09G 2300/0819;
(Continued)

(56) References Cited

U.S. PATENT DOCUMENTS 11,605,352 B2 * 3/2023 Wang .................. G09G 3/3266
2015/0371590 A1 * 12/2015 Jeong .................. G09G 3/3291 345/82

(Continued)

FOREIGN PATENT DOCUMENTS

CN 114241993 A 3/2022
KR 20170005945 A 1/2017

OTHER PUBLICATIONS

International Search Report and Written Opinion for International Application No. PCT/US2023/017231, mailed May 30, 2023, 10 pages.

*Primary Examiner* — Amy Onyekaba
(74) *Attorney, Agent, or Firm* — Weaver Austin Villeneuve & Sampson LLP

(57) ABSTRACT

Embodiments relate to a display device including pixels that compensate a threshold voltage of a driving transistor, the pixels arranged in a plurality of rows. The gate of the driving transistor of each pixel is coupled to a pixel data switch and a reference voltage switch, configured to selectively provide pixel data provided via a data line and a reference voltage provided via a separate reference voltage line to the gate of the driving transistor, respectively. As pixel data and the reference voltage are provided to the driving transistor via separate lines, the compensation period of the pixel may overlap in time with a data writing period of pixels of a previous row of the display device, increasing the rate at which the display device is able to program the pixels of each row.

20 Claims, 13 Drawing Sheets

(52) U.S. Cl.
CPC ............... *G09G 2300/0861* (2013.01); *G09G 2310/0251* (2013.01); *G09G 2310/0297* (2013.01); *G09G 2310/08* (2013.01); *G09G 2320/045* (2013.01); *G09G 2330/028* (2013.01)

(58) Field of Classification Search
CPC ... G09G 2300/0852; G09G 2300/0861; G09G 2310/0251; G09G 2310/0297; G09G 2310/08; G09G 2320/045; G09G 2330/028
See application file for complete search history.

(56) References Cited

U.S. PATENT DOCUMENTS

| | | | | |
|---|---|---|---|---|
| 2016/0254338 | A1* | 9/2016 | Lin | H01L 29/78603<br>257/40 |
| 2018/0166025 | A1* | 6/2018 | Zhou | G09G 3/3233 |
| 2018/0226023 | A1* | 8/2018 | Park | H10K 50/805 |
| 2018/0277037 | A1* | 9/2018 | Lin | G06F 3/0412 |
| 2019/0181211 | A1* | 6/2019 | Bae | H10K 59/1213 |
| 2019/0251907 | A1* | 8/2019 | Park | G09G 3/3266 |
| 2022/0093046 | A1* | 3/2022 | Yan | G09G 3/3266 |
| 2022/0199022 | A1* | 6/2022 | Huangfu | G09G 3/3233 |
| 2022/0351686 | A1* | 11/2022 | Wang | G09G 3/3241 |
| 2023/0186855 | A1* | 6/2023 | Kubota | G09G 3/3233<br>345/691 |
| 2023/0215353 | A1* | 7/2023 | Zhang | G09G 3/3233<br>345/204 |

* cited by examiner

300

HIGH SPEED PIXEL CIRCUIT FOR ORGANIC LIGHT EMITTING DIODE (OLED) DISPLAY

CROSS REFERENCE TO RELATED APPLICATIONS

This application claims a priority and benefit to U.S. Provisional Patent Application Ser. No. 63/326,645, filed Apr. 1, 2022, which is hereby incorporated by reference in its entirety.

BACKGROUND

This disclosure relates to a display device, and specifically to compensation of the threshold voltage of a driving transistor in a pixel.

A display device is often used in a virtual reality (VR) or augmented-reality (AR) system as a head-mounted display (HMD) or a near-eye display (NED). To display high resolution images, it is beneficial to increase the number of pixels in the display device and operate the display device with a higher frame rate. However, when there is an increased number of pixels in a display device being operated at a higher frame rate, time allocated for preparing and writing of data to pixels are reduced. Especially, when organic light emitting diode (OLED) display devices are used, operations associated with compensating the threshold voltage of driving transistors by using a reference voltage tend to take up an extended amount of time. Such prolonged time associated with the compensation of the threshold voltage restricts a number of pixels that may be multiplexed to receive pixel data over a data line.

SUMMARY

Embodiments relate to a display device having a data line, a gate line intersecting with the data line, a pixel coupled to the data line and the gate line. The pixel comprises an organic light emitting diode (OLED) coupled to a low voltage source, a data select switch, a reference voltage switch, an emission switch, and a driving transistor. The data select switch selectively passes through pixel data from the data line responsive to receiving a gate signal from the gate line, and is turned on during a data writing period for the pixel. The reference voltage switch selectively passes through a reference voltage responsive to receiving a gate signal from a second gate line, and is turned on during at least a compensation period for the pixel. The emission switch selectively connects the driving transistor to a voltage source higher than the low voltage source, and is configured to be on during an emission period for the pixel. The driving transistor has a drain coupled to the OLED, a gate coupled to the data select transistor and the reference voltage transistor to receive the reference voltage in the compensation period and the pixel data in the data writing period, and a source coupled to the emission switch.

In some embodiments, the display device comprises a plurality of rows of pixels, and wherein the compensation period for the pixel overlaps in time with a data writing period of a pixel of a previous row of the display device.

In some embodiments, the pixel further comprises a reset switch coupled to the drain of the driving transistor to disable current flow in the OLED when turned on during the compensation period and the data writing period, and to enable current flow in the OLED when turned off during the emission period. In some embodiments, the reset switch is controlled via a reset signal, and the second gate line is configured to receive a reset signal of a previous row of the display device.

In some embodiments, the pixel further comprises a first capacitor between the gate of the driving transistor and a source of the driving transistor. The pixel may further comprise a second capacitor coupled between the high voltage source and the source of the driving transistor in parallel with the emission switch.

In some embodiments, the data select switch, reference voltage switch, emission switch, and driving transistor are P-channel metal-oxide-semiconductor (PMOS) transistors.

In some embodiments, the display further comprising a demultiplexer connected to a source drive circuit. The demultiplexer is configured to sequentially couple a plurality of data lines including the data line to a signal line from the source driver circuit during a preparation period prior to the data writing period.

The figures depict embodiments of the present disclosure for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 1A:
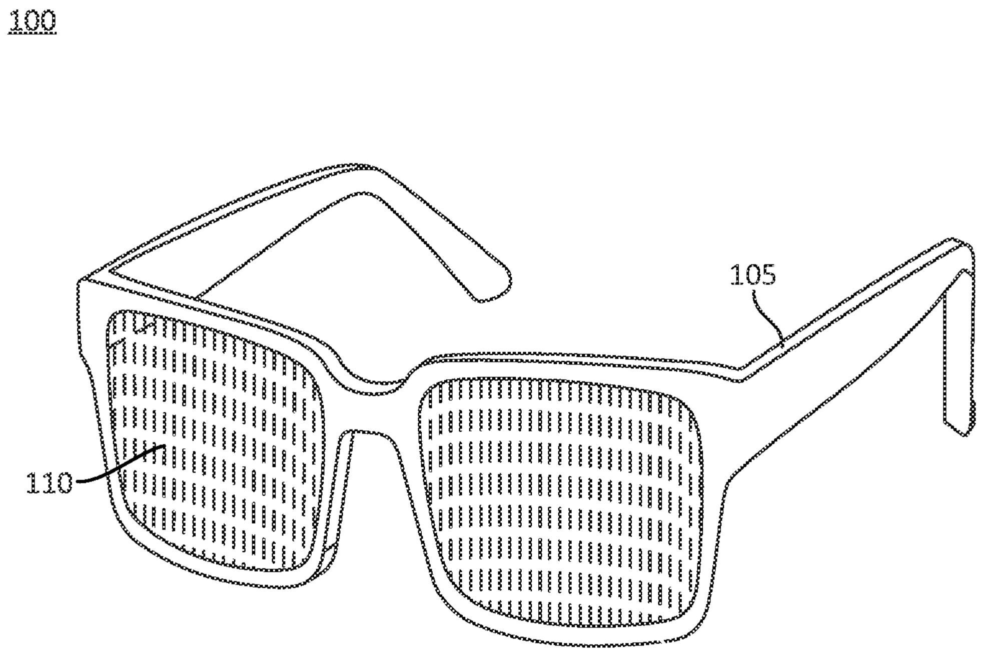
FIGS. 1A and 1B are diagrams of head-mounted displays (HMDs) that include near-eye displays (NED), according to some embodiments.
Figure 1B:
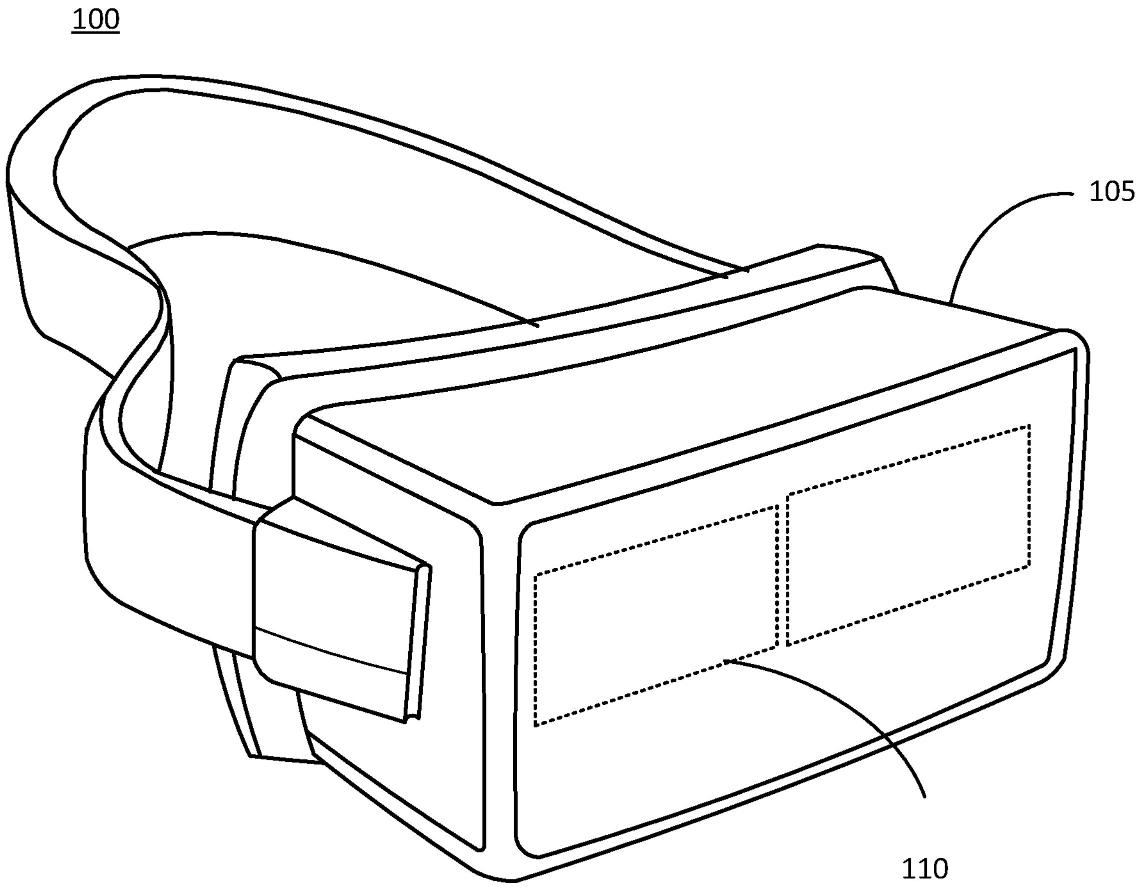

FIGS. 1A and 1B are diagrams of head-mounted displays (HMDs) 100 that include near-eye displays (NED) 110, according to some embodiments. The 110 may present media to a user. Examples of media that may be presented by the NED 110 include one or more images, video, audio, or some combination thereof. In some embodiments, audio may be presented via an external device (e.g., speakers and/or headphones) that receives audio information from the HMD 100, a console (not shown), or both, and presents audio data to the user based on the audio information. The HMD 100 is generally configured to operate as a virtual reality (VR) HMD. However, in some embodiments, the HMD 100 may be modified to also operate as an augmented reality (AR) HMD, a mixed reality (MR) HMD, or some combination thereof. For example, in some embodiments, the HMD 100 may augment views of a physical, real-world environment with computer-generated elements (e.g., still images, video, sound, etc.).

The HMD 100 shown in FIG. 1A or 1B may include a frame 105 and a display 110. The frame 105 may include one or more optical elements that together display media to a user. That is, the display 110 may be configured for a user to view the content presented by HMD 100. As discussed below in conjunction with FIG. 2, the display 110 may include at least one source assembly to generate image light to present optical media to an eye of the user. The source assembly may include, e.g., a source, an optics system, or some combination thereof.

FIGS. 1A and 1B are merely examples of a virtual reality system, and the display systems described herein may be incorporated into further such systems.

Figure 2:
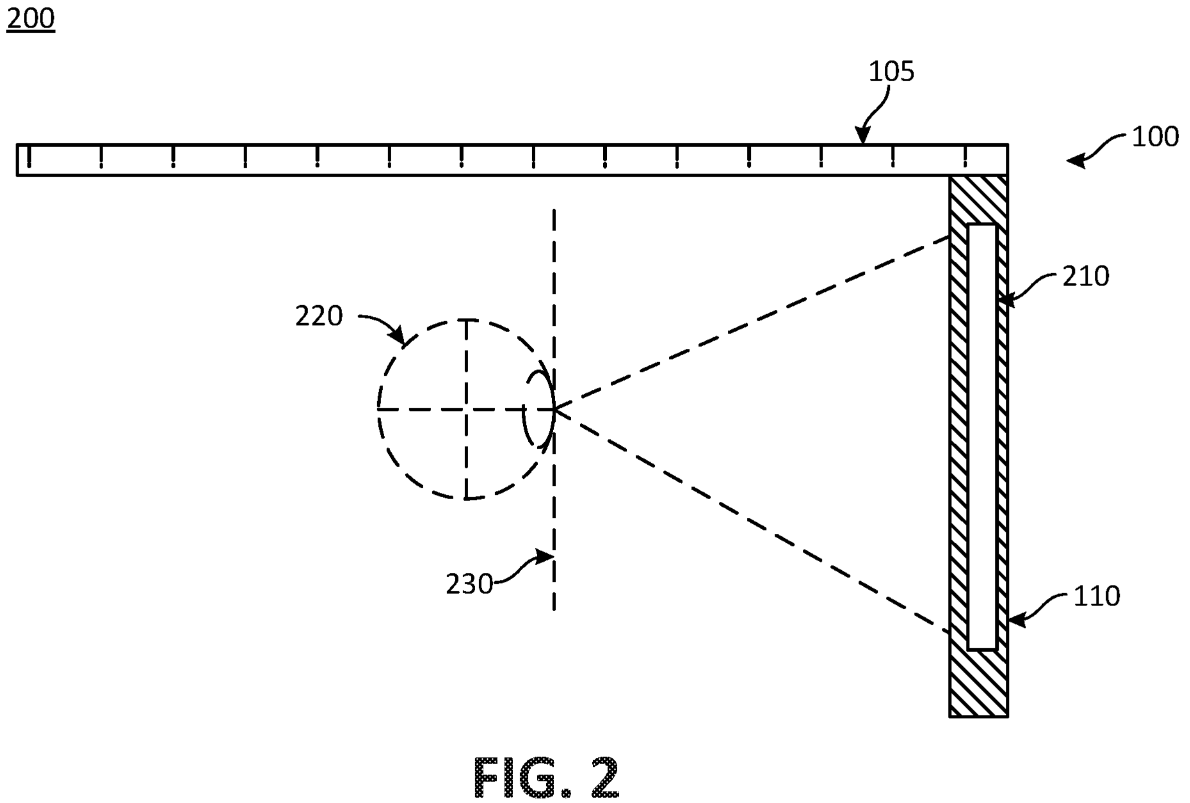
FIG. 2 is a cross-sectional view of the HMD illustrated in FIG. 1A or 1B, according to some embodiments.

FIG. 2 is a cross section 200 of the HMD 100 illustrated in FIG. 1A or 1B, in accordance with some embodiments of the present disclosure. The cross section 200 may include at least one display assembly 210, and an exit pupil 230. The exit pupil 230 is a location where the eye 220 may be positioned when the user wears the HMD 100. In some embodiments, the frame 105 may represent a frame of eye-wear glasses. For purposes of illustration, FIG. 2 shows the cross section 200 associated with a single eye 220 and a single display assembly 210, but in alternative embodiments not shown, another display assembly that is separate from or integrated with the display assembly 210 shown in FIG. 2, may provide image light to another eye of the user.

The display assembly 210 may direct the image light to the eye 220 through the exit pupil 230. The display assembly 210 may be composed of one or more materials (e.g., plastic, glass, etc.) with one or more refractive indices that effectively decrease the weight and widen a field of view of the HMD 100.

In alternate configurations, the HMD 100 may include one or more optical elements (not shown) between the display assembly 210 and the eye 220. The optical elements may act to, by way of various examples, correct aberrations in image light emitted from the display assembly 210, magnify image light emitted from the display assembly 210, perform some other optical adjustment of image light emitted from the display assembly 210, or combinations thereof. Example optical elements may include an aperture, a Fresnel lens, a convex lens, a concave lens, a filter, or any other suitable optical element that may affect image light.

In some embodiments, the display assembly 210 may include a source assembly to generate image light to present media to a user's eyes. The source assembly may include, e.g., a light source, an optics system, or some combination thereof. In accordance with various embodiments, a source assembly may include a light-emitting diode (LED) such as an organic light-emitting diode (OLED). In some embodiments, the source assembly may correspond to other types of displays in which pixels are arranged in rows and columns, and connected to respective gate and data lines, such as non-OLED LED or micro-LED displays.

Figure 3:
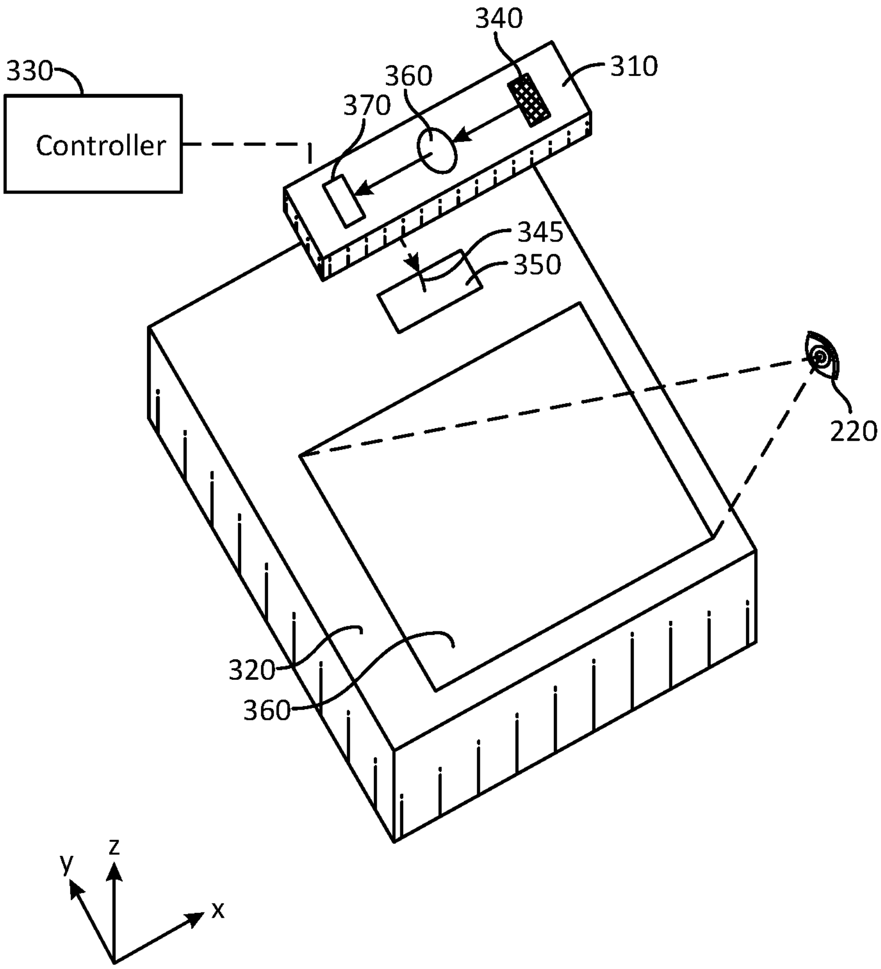
FIG. 3 illustrates a perspective view of a waveguide display, according to some embodiments.

FIG. 3 illustrates a perspective view of a waveguide display 300 in accordance with some embodiments. The waveguide display 300 may be a component (e.g., display assembly 210) of HMD 100. In alternate embodiments, the waveguide display 300 may constitute a part of some other HMD, or other system that directs display image light to a particular location.

The waveguide display 300 may include, among other components, a source assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300 may provide image light to another eye of the user. In a partially separate system, for instance, one or more components may be shared between waveguide displays for each eye.

The source assembly 310 generates image light. The source assembly 310 may include a source 340, a light conditioning assembly 360, and a scanning mirror assembly 370. The source assembly 310 may generate and output image light 345 to a coupling element 350 of the output waveguide 320.

The source 340 may include a source of light that generates at least a coherent or partially coherent image light 345. The source 340 may emit light in accordance with one or more illumination parameters received from the controller 330. The source 340 may include one or more source elements, including, but not restricted to light emitting diodes, such as micro-OLEDs, as described in detail below with reference to FIGS. 4-11. While the below description primarily describes the source 340 as comprising OLEDs and/or micro-OLEDs, it is understood that in other embodiments, the source 340 may comprise other types of source elements, such as micro-LEDs.

The output waveguide 320 may be configured as an optical waveguide that outputs image light to an eye 220 of a user. The output waveguide 320 receives the image light 345 through one or more coupling elements 350 and guides the received input image light 345 to one or more decoupling elements 360. In some embodiments, the coupling element 350 couples the image light 345 from the source assembly 310 into the output waveguide 320. The coupling element 350 may be or include a diffraction grating, a holographic grating, some other element that couples the image light 345 into the output waveguide 320, or some combination thereof. For example, in embodiments where the coupling element 350 is a diffraction grating, the pitch of the diffraction grating may be chosen such that total internal reflection occurs, and the image light 345 propagates internally toward the decoupling element 360. For example, the pitch of the diffraction grating may be in the range of approximately 300 nm to approximately 600 nm.

The decoupling element 360 decouples the total internally reflected image light from the output waveguide 320. The decoupling element 360 may be or include a diffraction grating, a holographic grating, some other element that decouples image light out of the output waveguide 320, or some combination thereof. For example, in embodiments where the decoupling element 360 is a diffraction grating, the pitch of the diffraction grating may be chosen to cause incident image light to exit the output waveguide 320. An orientation and position of the image light exiting from the output waveguide 320 may be controlled by changing an orientation and position of the image light 345 entering the coupling element 350.

The output waveguide 320 may be composed of one or more materials that facilitate total internal reflection of the image light 345. The output waveguide 320 may be composed of, for example, silicon, glass, or a polymer, or some combination thereof. The output waveguide 320 may have a relatively small form factor such as for use in a head-mounted display. For example, the output waveguide 320 may be approximately 30 mm wide along an x-dimension, 50 mm long along a y-dimension, and 0.5-1 mm thick along a z-dimension. In some embodiments, the output waveguide 320 may be a planar (2D) optical waveguide.

The controller 330 may be used to control the scanning operations of the source assembly 310. In certain embodiments, the controller 330 may determine scanning instructions for the source assembly 310 based at least on one or more display instructions. Display instructions may include instructions to render one or more images. In some embodiments, display instructions may include an image file (e.g., bitmap). The display instructions may be received from, e.g., a console of a virtual reality system (not shown). Scanning instructions may include instructions used by the source assembly 310 to generate image light 345. The scanning instructions may include, e.g., a type of a source of image light (e.g. monochromatic, polychromatic), a scanning rate, an orientation of scanning mirror assembly 370, and/or one or more illumination parameters, etc. The controller 330 may include a combination of hardware, software, and/or firmware not shown here so as not to obscure other aspects of the disclosure.

According to some embodiments, source 340 may include a light emitting diode (LED), such as an organic light emitting diode (OLED). An organic light-emitting diode (OLED) is a light-emitting diode (LED) having an emissive electroluminescent layer that may include a thin film of an organic compound that emits light in response to an electric current. The organic layer is typically situated between a pair of conductive electrodes. One or both of the electrodes may be transparent.

As will be appreciated, an OLED display can be driven with a passive-matrix (PMOLED) or active-matrix (AMOLED) control scheme. In a PMOLED scheme, each row (and line) in the display may be controlled sequentially, whereas AMOLED control typically uses a thin-film transistor backplane to directly access and switch each individual pixel on or off, which allows for higher resolution and larger display areas.

In other embodiments, the OLED display is embodied as part of a display panel that does not include any waveguide. The OLED display may be a screen that is viewable directly by to the user's eye instead of passing light through a waveguide.

Figure 4:
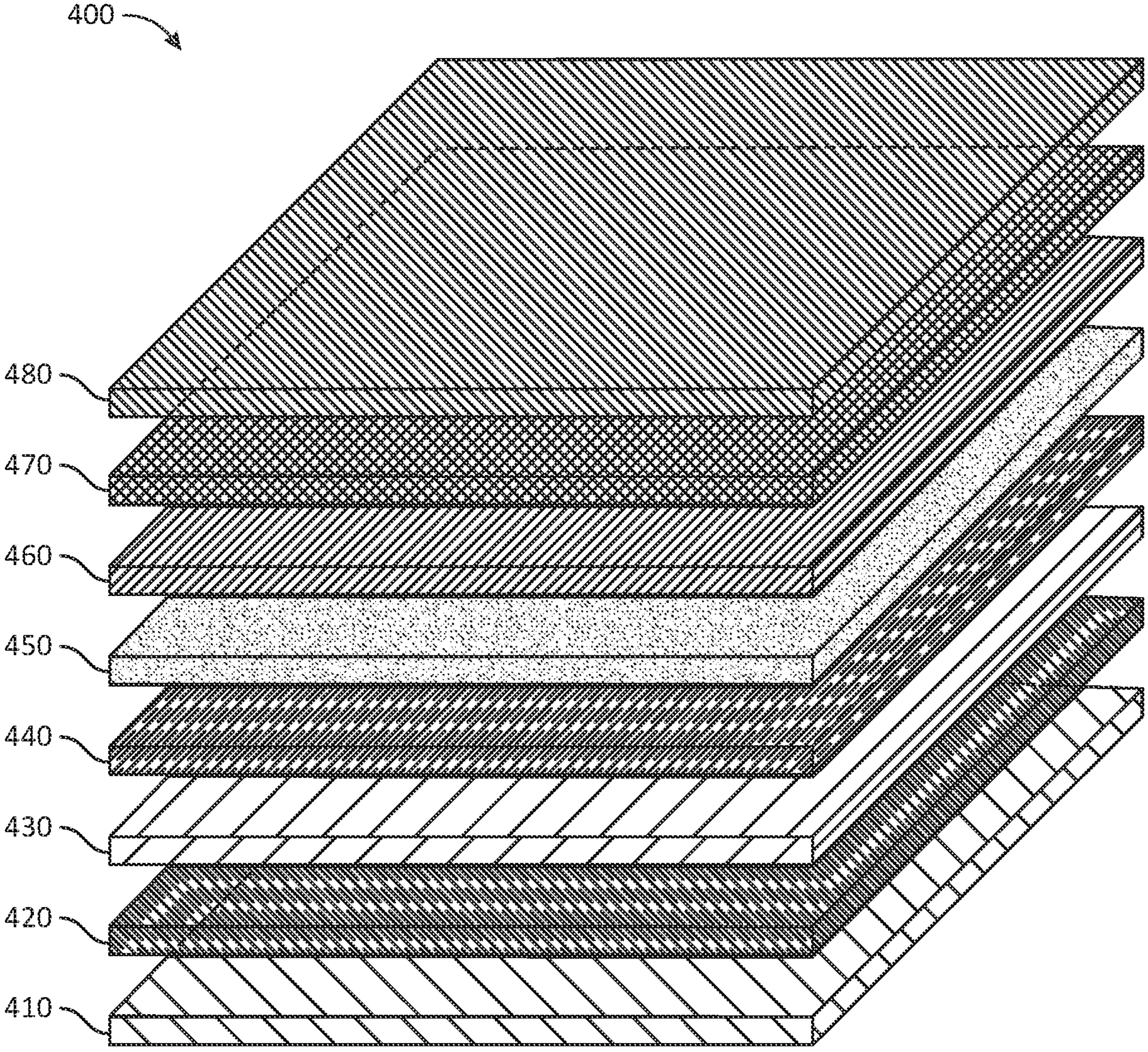
FIG. 4 depicts a simplified organic light emitting diode (OLED) structure, according to some embodiments.

FIG. 4 depicts a simplified OLED structure according to some embodiments. As shown in an exploded view, OLED 400 may include, from bottom to top, a substrate 410, anode 420, hole injection layer 430, hole transport layer 440, emissive layer 450, blocking layer 460, electron transport layer 470, and cathode 480. In some embodiments, substrate (or backplane) 410 may include single crystal or polycrystalline silicon or other suitable semiconductor (e.g., germanium).

Anode 420 and cathode 480 may include any suitable conductive material(s), such as transparent conductive oxides (TCOs, e.g., indium tin oxide (ITO), zinc oxide (ZnO), and the like). The anode 420 and cathode 480 are configured to inject holes and electrons, respectively, into one or more organic layer(s) within emissive layer 450 during operation of the device.

The hole injection layer 430, which is disposed over the anode 420, receives holes from the anode 420 and is configured to inject the holes deeper into the device, while the adjacent hole transport layer 440 may support the transport of holes to the emissive layer 450. The emissive layer 450 converts electrical energy to light. Emissive layer 450 may include one or more organic molecules, or light-emitting fluorescent dyes or dopants, which may be dispersed in a suitable matrix as known to those skilled in the art.

Blocking layer 460 may improve device function by confining electrons (charge carriers) to the emissive layer 450. Electron transport layer 470 may support the transport of electrons from the cathode 480 to the emissive layer 450.

In some embodiments, the generation of red, green, and blue light (to render full-color images) may include the formation of red, green, and blue OLED sub-pixels in each pixel of the display. Alternatively, the OLED 400 may be adapted to produce white light in each pixel. The white light may be passed through a color filter to produce red, green, and blue sub-pixels.

Any suitable deposition process(es) may be used to form OLED 400. For example, one or more of the layers constituting the OLED may be fabricated using physical vapor deposition (PVD), chemical vapor deposition (CVD), evaporation, spray-coating, spin-coating, atomic layer deposition (ALD), and the like. In further aspects, OLED 400 may be manufactured using a thermal evaporator, a sputtering system, printing, stamping, etc.

According to some embodiments, OLED 400 may be a micro-OLED. A "micro-OLED," in accordance with various examples, may refer to a particular type of OLED having a small active light emitting area (e.g., less than 2,000 μm2 in some embodiments, less than 20 μm2 or less than 10 μm2 in other embodiments). In some embodiments, the emissive surface of the micro-OLED may have a diameter of less than approximately 2 μm. Such a micro-OLED may also have collimated light output, which may increase the brightness level of light emitted from the small active light emitting area.

Figure 5:
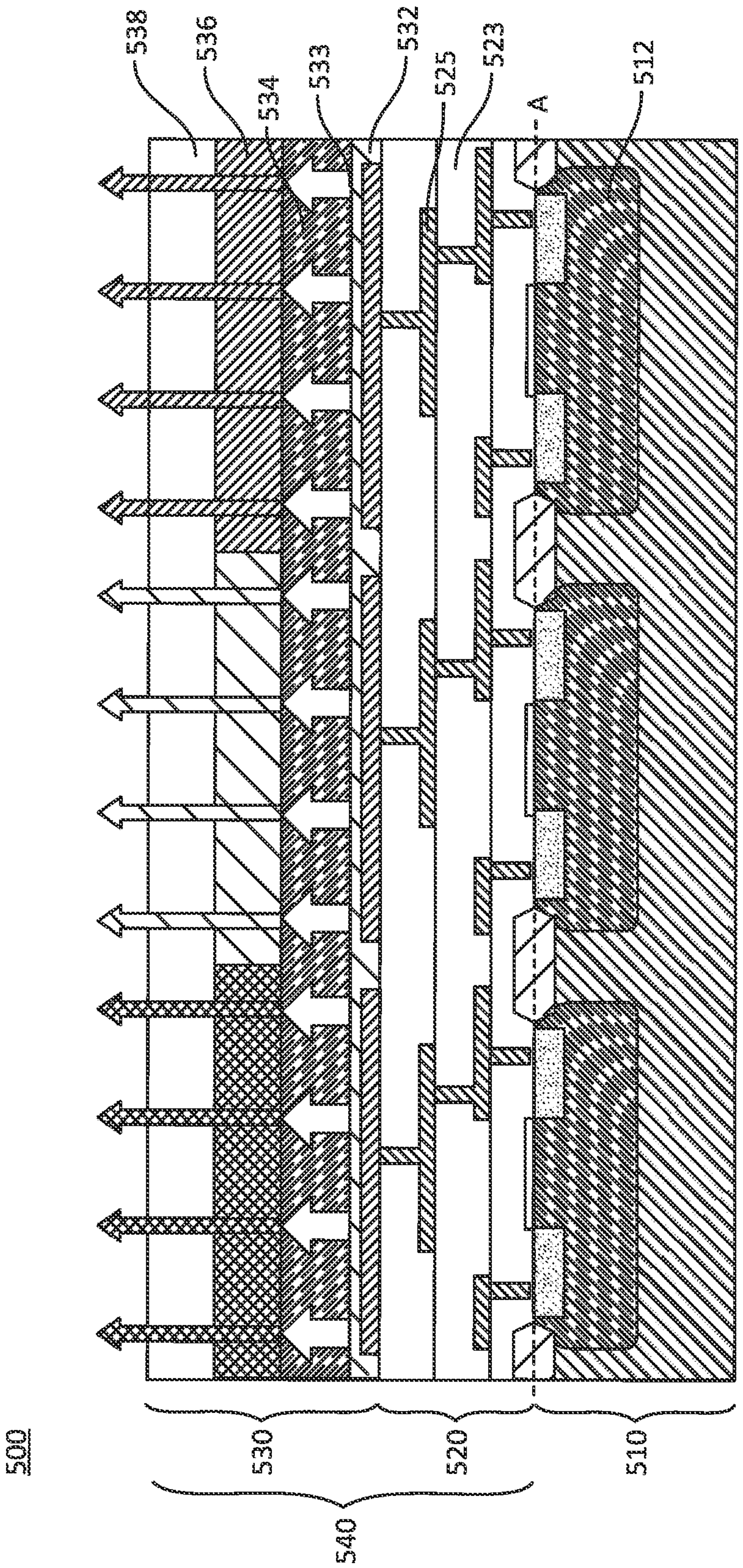
FIG. 5 is a schematic view of an OLED display device architecture including a display driver integrated circuit (DDIC), according to some embodiments.

FIG. 5 is a schematic view of an OLED display device architecture including a display driver integrated circuit (DDIC) 510 according to some embodiments. According to some embodiments, OLED display device 500 (e.g., micro-OLED chip) may include an active display area 530 having an active matrix 532 (such as OLED 400) disposed over a single crystal (e.g., silicon) backplane 520. The combined display/backplane architecture, i.e., display element 540 may be bonded (e.g., at or about interface A) directly or indirectly to the DDIC 510. As illustrated in FIG. 5, DDIC 510 may include an array of driving transistors 512, which may be formed using conventional CMOS processing. One or more display driver integrated circuits may be formed over a single crystal (e.g., silicon) substrate.

In some embodiments, the active display area 530 may have at least one areal dimension (i.e., length or width) greater than approximately 1.3 inches, e.g., approximately 1.4, 1.5, 1.6, 1.7, 1.8, 1.9, 2.0, 2.25, 2.5, 2.75, or 3 inches, including ranges between any of the foregoing values, although larger area displays are contemplated.

Backplane 520 may include a single crystal or polycrystalline silicon layer 523 having a through silicon via 525 for electrically connecting the DDIC 510 with the active display area 530. In some embodiments, active display area 530 may further include a transparent encapsulation layer 534 disposed over an upper emissive surface 533 of active matrix 532, a color filter 536, and cover glass 538.

According to various embodiments, the active display area 530 and underlying backplane 520 may be manufactured separately from, and then later bonded to, DDIC 510, which may simplify formation of the OLED active area, including formation of the active matrix 532, color filter 536, etc.

The DDIC 510 may be directly bonded to a back face of the backplane opposite to active matrix 532. In further embodiments, a chip-on-flex (COF) packaging technology may be used to integrate display element 540 with DDIC 510, optionally via a data selector (i.e., multiplexer) array (not shown) to form OLED display device 500. As used herein, the terms “multiplexer” or “data selector” may, in some examples, refer to a device adapted to combine or select from among plural analog or digital input signals, which are transmitted to a single output. Multiplexers may be used to increase the amount of data that can be communicated within a certain amount of space, time, and bandwidth.

As used herein, “chip-on-flex” (COF) may, in some examples, refer to an assembly technology where a microchip or die, such as an OLED chip, is directly mounted on and electrically connected to a flexible circuit, such as a direct driver circuit. In a COF assembly, the microchip may avoid some of the traditional assembly steps used for individual IC packaging. This may simplify the overall processes of design and manufacture while improving performance and yield.

In accordance with certain embodiments, assembly of the COF may include attaching a die to a flexible substrate, electrically connecting the chip to the flex circuit, and encapsulating the chip and wires, e.g., using an epoxy resin to provide environmental protection. In some embodiments, the adhesive (not shown) used to bond the chip to the flex substrate may be thermally conductive or thermally insulating. In some embodiments, ultrasonic or thermosonic wire bonding techniques may be used to electrically connect the chip to the flex substrate.

Figure 6:
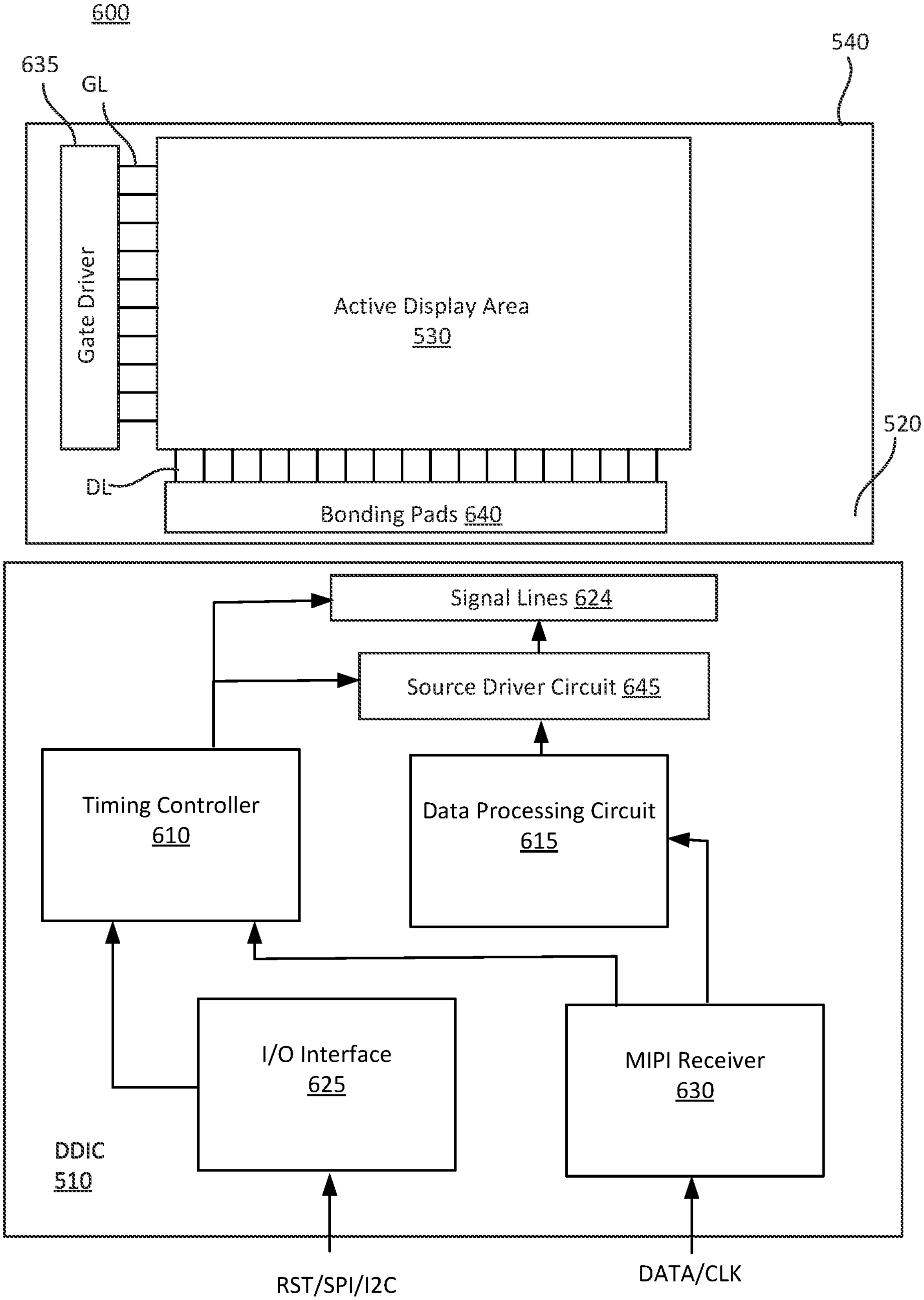
FIG. 6 is a schematic view of an OLED display device, according to some embodiments.

FIG. 6 is a schematic view of an OLED display device 600 according to some embodiments. The OLED display device 600 may include, among other components, the DDIC 510 and the display element 540. The display element 540 may be an integrated circuit including the backplane 520, the active display area 530, bonding pads 640, and a control circuit for controlling the active display area 530. The control circuit may include a gate driver 635. The DDIC 510 may include a timing controller 610, a data processing circuit 615, an input/output (I/O) interface 620, a mobile industry processor interface (MIPI) receiver 625, a source driver circuit 645 and signal lines 624. In other embodiments, one or more components of the DDIC 510 may be disposed in the display element 540.

The timing controller 610 may be configured to generate timing control signals for the gate driver 635, the source driver circuit 645, and other components in the display element 540. The timing control signals may include one or more clock signals, a vertical synchronization signal, a horizontal synchronization signal, and a start pulse. However, timing control signals provided from the timing controller 610 according to embodiments of the present disclosure are not limited thereto.

The data processing circuit 615 may be configured to receive image data DATA from the MIPI receiver 630 and convert the data format of the image data DATA to generate data signals input to the source driver circuit 645 for displaying images in the active display area 530.

The I/O interface 625 is a circuit that receives control signals from other sources and sends operation signals to the timing controller 610. The control signals may include a reset signal RST to reset the display element 540 and signals according to serial peripheral interface (SPI) or inter-integrated circuit (I2C) protocols for digital data transfer. Based on the received control signals, the I/O interface 625 may process commands from a system on a chip (SoC), a central processing unit (CPU), or other system control chip.

The MIPI receiver 630 may be a MIPI display serial interface (DSI), which may include a high-speed packet-based interface for delivering video data to the pixels in the active display area 530. The MIPI receiver 630 may receive image data DATA and clock signals CLK and provide timing control signals to the timing controller 610 and image data DATA to the data processing circuit 615.

The active display area 530 may include a plurality of pixels arranged into rows and columns with each pixel including a plurality of subpixels (e.g., a red subpixel, a green subpixel, a blue subpixel). Each subpixel may be connected to a gate line GL and a data line DL and driven to emit light according to a data signal received through the connected data line DL when the connected gate line GL provides a gate-on signal to the subpixel.

The backplane 520 may include conductive traces for electrically connecting the pixels in the active display area 530, the gate driver 635, the source driver circuit 645, and the bonding pads 640. The bonding pads 640 are conductive regions on the backplane 520 that are electrically coupled to the signal lines 624 of the DDIC 510 to receive timing control signals from the timing controller 610, and data signals from the source driver circuit 645. The bonding pads 640 are connected to the gate driver 635 and other circuit elements in the backplane 520. In the embodiment illustrated in FIG. 6, the DDIC 510 generates data signals and timing control signals and transmits the signals to the bonding pads 640 of the display element 540. However, in other embodiments, the timing controller 610, the source driver circuit 645 and/or the data processing circuit 615 may be in the display element 540 instead of the DDIC 510. When the timing controller 610 and/or the data processing circuit 615 are on the display element 540, there may be fewer bonding pads 640 since the data signals and timing control signals may be directly transmitted to the corresponding component without a bonding pad 640.

The gate driver 635 may be connected to a plurality of gate lines GL and provide gate-on signals to the plurality of gate lines GL at appropriate times. The gate driver 635 includes a plurality of stages, where each stage is connected to a gate line GL that outputs gate-on signals to a row of pixels.

The source driver circuit 645 may receive data signals from the data processing circuit 615 and provide the data signals to the active display area 530 via data lines DL. The source driver circuit 645 may include a plurality of source drivers, each source driver connected to a column of pixels via a data line DL.

Figure 7:
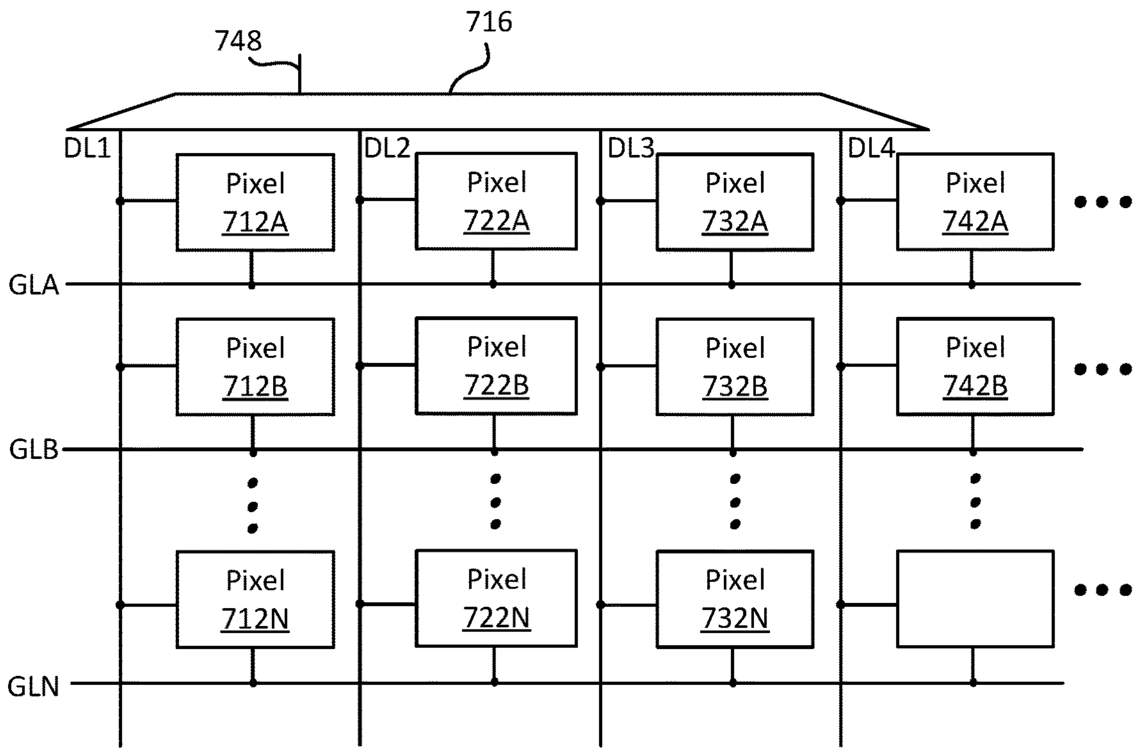
FIG. 7 illustrates an arrangement of pixels in the OLED display device, according to some embodiments.

FIG. 7 illustrates an example OLED pixel arrangement, according to some embodiments. The pixel arrangement includes, among others, columns of pixels 712A through 712N (collectively referred to also as "pixels 712" hereinafter), columns of pixels 722A through 722N (collectively referred to also as "pixels 722" hereinafter), columns of pixels 732A through 732N (collectively referred to also as "pixels 732" hereinafter), and columns of pixels 742A through 742N (collectively referred to also as "pixels 742" hereinafter). Although not illustrated in FIG. 7, additional columns of pixels may be arranged at the right side and/or the left side of pixels columns shown. Each of pixels (e.g., pixel 712B) is connected to a corresponding data line (e.g., DL1) and a gate line (e.g., GLB). In other embodiments, each pixel 712, 722, 732, and 742 may correspond to other types of pixel, such as a micro-LED pixel.

Data lines (e.g., DL1 through DL4) are connected to a demultiplexer 716 that is connected to the source driver circuit 645 via the signal line 748 to receive multiplexed pixel data. Although only a single demultiplexer 716 is illustrated in FIG. 7, other demultiplexers connected to different signal lines and other columns of pixels may be arranged at the right side and/or the left side of demultiplexer 716 to program additional columns of pixels. For example, in some embodiments, the display element comprises a plurality of demultiplexers, each connected to the source driver circuit 645 via a respective signal line and to a respective set of pixel columns (e.g., 4 pixel columns) via a respective set of data lines.

In some embodiments, the pixel data $V_{DATA}$ for programming columns of pixels is time multiplexed by a multiplexer (not shown) and then demultiplexed by demultiplexer 716 so that fewer signal lines (e.g., line 748) are used between the source driver circuit 645 and the array of pixels. Because each demultiplexer receives pixel data $V_{DATA}$ for programming pixels for its respective set columns of pixels in parallel, an amount of time needed to program the pixels for a particular row n of the display unit (referred to as a row period $T_{ROW}$) is defined by an amount of time to program the pixels of the row n corresponding to a particular demultiplexer. Although it is beneficial to multiplex the pixel data for more data lines using the multiplexer and the demultiplexer, the settling time associated with a reference voltage for compensating the threshold voltage of driving transistors in the pixels may restrict the extent of multiplexing/demultiplexing that may be performed for a given row period $T_{ROW}$, as illustrated below with reference to FIGS. 8A and 8B.

The gate lines GLA through GLN provide gate-on signals to pixels from the gate driver 635. In the example of FIG. 7, each row of pixels is connected one of the gate lines GLA through GLN to receive a gate-on signal. The gate-on signal indicates when a row of pixels should be connected to a data line to receive pixel data for programming the pixels, by controlling a data selection switch (SEL or PSEL) of each pixel (e.g., shown in FIG. 8A), where the SEL switch is turned on when the gate-on signal is active but is turned off when the gate-on signal is inactive.

The display element 540 further includes timing signal lines (not shown) from the gate driver 635 to provide other timing signals. For example, the display element 540 may include horizontal lines carrying timing signals for operating various switches in the pixels, as described below with reference to FIGS. 8A and 8B.

Figure 8A:
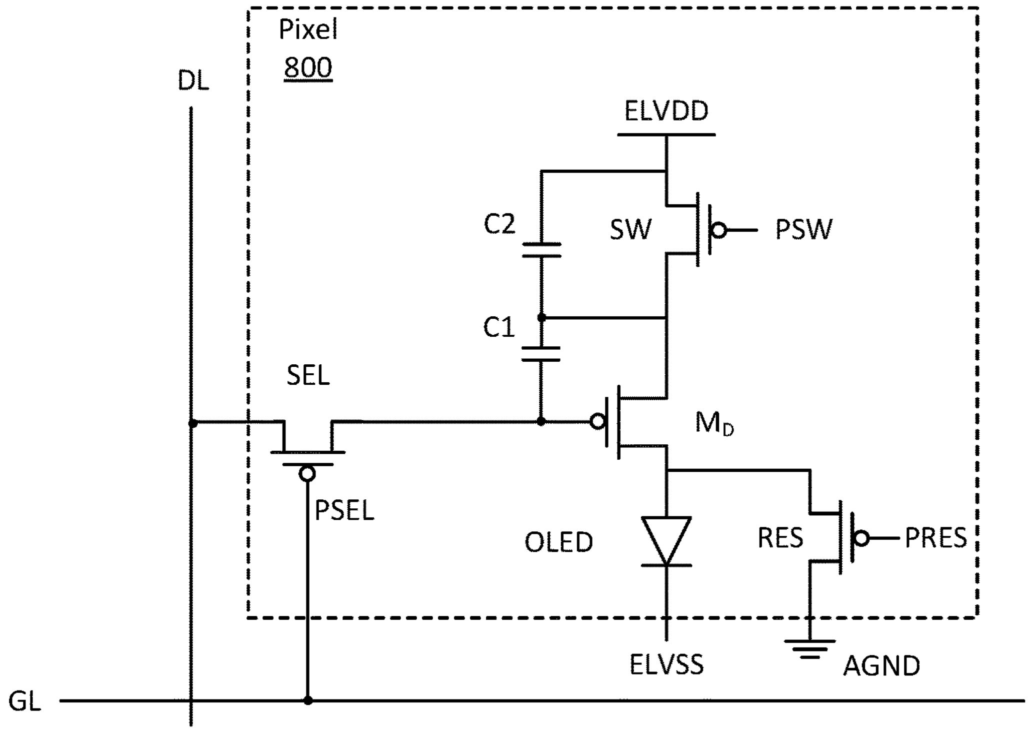
FIG. 8A is a circuit diagram of a pixel with four transistors and two capacitors, according to some embodiments.

FIG. 8A is a circuit diagram illustrating a pixel 800, according to some embodiments. The pixel 800 may be any of the pixels in the display element 540 including, but not limited to, any of the pixels 712, 722, 723, or 724. The pixel 800 may include, among other components, a driving transistor $M_D$, an OLED, a selection switch (SEL), a reset switch (RES), a emission switch (SW), and one or more storage capacitors (e.g., capacitor C1 and capacitor C2). As shown in FIG. 8A, the driving transistor $M_D$, the selection switch (SEL), reset switch (RES), and emission switch (SW) are each implemented as P-channel metal-oxide-semiconductor (PMOS) transistors, where gate signals of the selection switch (SEL), reset switch (RES), and emission switch (SW) are controlled by the timing signals PSEL (provided via the gate line GL), PRES, and PSW, respectively. These components may be fabricated on a silicon substrate, or implemented as thin-film transistors (TFTs) formed on a transparent substrate (e.g., glass). In other embodiments, one or more of these components may be implemented using other types of switches (e.g., NMOS transistors).

The OLED of the pixel 800 is connected between a low voltage source ELVSS and a drain of the driving transistor $M_D$. When the emission switch SW is turned on and reset switch RES is turned off (e.g., PSW is low and PRES is high), the driving transistor $M_D$ generates current in its drain that increases as a voltage stored by the storage capacitor C1 increases. The current is then provided to the OLED to drive the OLED, which generates light of intensity that corresponds to the amount of current provided by the driving transistor $M_D$.

The selection switch SEL controls a connection between the gate terminal of the driving transistor $M_D$ and the data line DL. When the gate line GL provides a gate-on signal (e.g., PSEL turns low), the switch SEL turns on, connecting the gate of the driving transistor $M_D$ to the data line DL and charging the storage capacitor C1 based on a voltage difference between the voltage of the pixel data at the data line DL and the high voltage level ELVDD. When the gate-on signal is turned off in gate line GL (e.g., PSEL turns high), the selection switch SEL is turned off, disconnecting the gate of the driving transistor $M_D$ from the data line DL.

The reset switch RES enables or disables the current from the driving transistor $M_D$ to flow in the OLED. When the reset switch RES is turned on (e.g., PRES is low), current from the driving transistor $M_D$ flows through the reset switch RES to ground (AGND) or a separate voltage level (e.g., VRES, not shown), bypassing the OLED. Conversely, when the reset switch RES is turned off (e.g., PRES is high), current from the driving transistor $M_D$ is able to flow through the OLED.

The emission switch SW is turned on or off to couple a high voltage source ELVDD to a source of the driving transistor $M_D$. Capacitor C2 stores a voltage difference between the high voltage source ELVDD and the source of the driving transistor $M_D$ when the emission switch SW is turned off.

As the threshold voltage of the driving transistor $M_D$ changes (e.g., due to deterioration or external factors such as temperature), compensation operations may be performed by the pixel 800 to compensate for drift in the threshold voltage of the driving transistor $M_D$. For example, in some embodiments, a compensation operation (also referred to as "threshold compensation") is performed by providing an external reference signal to the pixel 800, to set the source-gate voltage of the driving transistor $M_D$ to a value based upon the threshold voltage of the driving transistor $M_D$. Such compensation may be performed every frame or once in a number of frames.

Figure 8B:
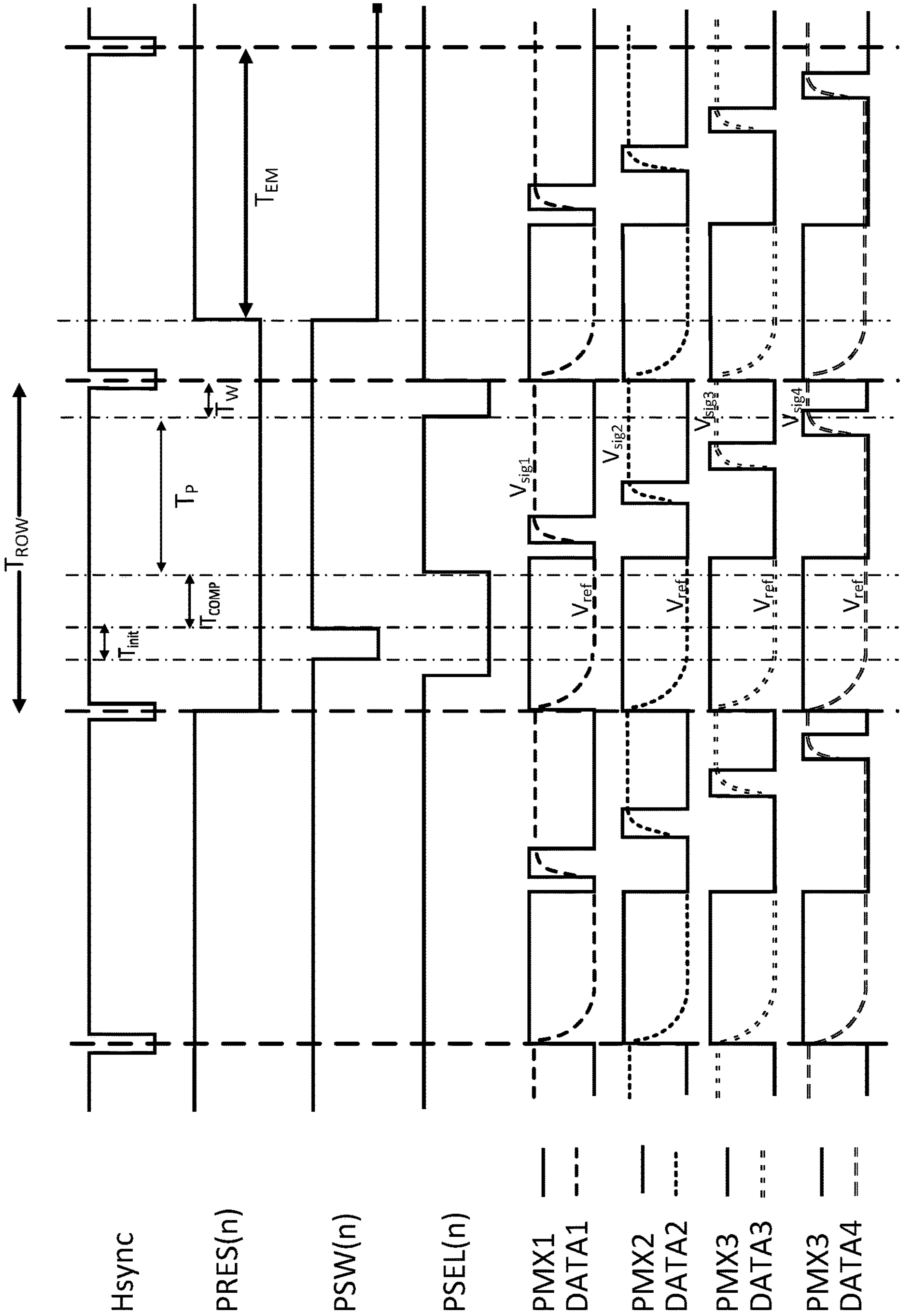
FIG. 8B is a timing diagram of signals for operating the pixels, according to one embodiment.

FIG. 8B is a timing diagram of signals for operating the pixel 800 using an external reference signal, according to one embodiment. In the example of FIG. 8B, a set of pixels, corresponding to four columns of pixels (e.g., columns of pixels 712, 722, 732, and 742), are connected to demultiplexer 716 via respective data lines DL1, DL2, DL3, and DL4, which selectively couples to the data lines to the source driver circuit 645 (e.g., based on demultiplexer signals PMX1, PMX2, PMX3, and PMX4, as shown in FIG. 8B, corresponding to data lines DL1, DL2, DL3, and DL4, respectively). PSW(n) illustrates a timing signal for turning on or off the emission switches SW in pixels of the same row n of the display unit (e.g., pixels 712A, 722A, 732A, and 742A of pixel row A), PRES(n) illustrates a timing signal for turning on or off the reset switches RES in the same row n of pixels, and PSEL(n) illustrate a timing signal for turning on or off selection switches SEL in the same row n of pixels, when the emission switches SW, reset switches RES, and selection switches SEL are embodied as PMOS transistors (e.g., as illustrated in FIG. 8A).

As shown in FIG. 8B, the row period $T_{ROW}$ for programming a particular row n of the display unit includes an initialization period ($T_{init}$), a compensation period ($T_{Comp}$), a data preparation period ($T_p$), and a data writing period ($T_w$). In some embodiments, the row period $T_{ROW}$ is defined by a synchronization signal (e.g., HSYNC or horizontal sync).

During the initialization period $T_{init}$, the set of pixels (corresponding to pixels of the columns 712, 722, 732, and 742 for a particular row n) are reset by turning on the selection switch (SEL) to provide an external reference voltage $V_{ref}$ to the gate of the driving transistor $M_D$, as well as turning on both the emission switch (SW) and reset switch (RES) to reset each of the set of pixels, e.g., via a reset current through the emission switch (SW) that flows through the driving transistor $M_D$ and the reset switch (RES).

During the compensation period $T_{Comp}$, to compensate for the threshold voltage of the driving transistors in each of the set of pixels, a compensation operation is performed in the columns of pixels 712, 722, 732, and 742 of the row n. During the compensation period $T_{COMP}$, an external reference voltage $V_{REF}$ is provided through the data lines DL1, DL2, DL3, and DL4 to the pixels, e.g., by turning on the selection switch (SEL) to provide an external reference voltage $V_{ref}$ to the gate of the driving transistor $M_D$, and turning the reset switch (RES) on and the emission switch (SW) off, to generate a discharge current that discharges the capacitor C1 to set the gate-source voltage of the driving transistor $M_D$ to a value based on the threshold voltage of the driving transistor $M_D$. For example, as shown in FIG. 8B, a compensation operation is performed on each of the set of pixels in parallel, where the demultiplexer (e.g., demultiplexer 716) connected to the source drives circuit (e.g., source driver circuit 645) couples the source driver to each of the data lines DL1, DL2, DL3, and DL4 in parallel (e.g., PMX1, PMX2, PMX3, and PMX4 signals all on), to provide the external reference voltage $V_{ref}$ to each of the set of pixels through the data lines DL1, DL2, DL3, and DL4 (shown in FIG. 8B by voltage values DATA1, DATA2, DATA3, and DATA4 corresponding to the respective data lines).

During the data preparation period $T_P$, the demultiplexer (e.g., demultiplexer 716) connected to the source driver circuit (e.g., source drive circuit 5$xx$) sequentially couples the plurality of the data lines associated with the set of pixels (e.g., DL1, DL2, DL3, and DL4) to a signal line from the source driver in a preparation period prior to the data writing period. For example, as shown in FIG. 8B as sequential periods during which the demultiplexer connects each data line in sequence with the source line (e.g., as indicted by PMX1, PMX2, PMX3, and PMX4 being set high in sequence) to load respective pixel value data onto each of the data lines (e.g., $V_{Sig1}$, $V_{Sig2}$, $V_{Sig3}$, and $V_{Sig4}$ onto data lines DL1, DL2, DL3, and DL4 respectively). During this period, the selection switch SEL and emission switch SW may be turned off, and the reset switch RES may be turned on, and no current flows through the pixels.

During the data writing period $T_W$, the selection switch SEL and the reset switch RES are turned on, while the emission switch SW is turned off, driving the gate voltage of the driving transistor $M_D$ to correspond to the pixel data loaded onto the data line corresponding to the pixel (e.g., $V_{Sig1}$, $V_{Sig2}$, $V_{Sig3}$, or $V_{Sig4}$), which is reflected by the voltage stored by the storage capacitor C1.

During the emission period $T_{EM}$, the selection switch SEL and the reset switch RES are turned off, while the emission switch SW is turned on, causing the driving transistor $M_D$ to generate current in its drain based on voltage stored by the storage capacitor C1 (e.g., based on the pixel data $V_{Sig1}$, $V_{Sig2}$, $V_{Sig3}$, or $V_{Sig4}$), which travels through the OLED to drive the OLED, causing the OLED to generate light of intensity that corresponds to the amount of current provided by the driving transistor $M_D$. In some embodiments, as shown in FIG. 8B, because the data lines DL1, DL2, DL3, and DL4 may be used to perform compensation operations, data preparation and writing for a subsequent row of the display unit in parallel with the emission period, the emission period TEM may be outside row period $T_{ROW}$.

Because a certain amount of time has to elapse before the reference voltage $V_{REF}$ settles, the compensation period $T_{COMP}$ may not be reduced below a certain threshold without affecting the compensation performance. The extended length of the compensation period $T_{COMP}$ may reduce the frame rate of the display $T_{FRAME}$, as the time needed to program each row of the frame $T_{ROW}$ needs to be long enough to accommodate both the compensation period $T_{COMP}$ as well as the time needed for preparing data (data preparation period ($T_p$), comprising $T_{P1}$, $T_{P2}$, $T_{P3}$, $T_{P4}$), and writing data (data writing period $T_W$). In addition, due to the length of the compensation period $T_{COMP}$, for a given row period $T_{ROW}$, a remaining portion of the row period $T_{ROW}$ that may be used for preparing and writing data is reduced. Such shortened time of the remaining period of $T_{ROW}$ limits the number of pixels in a row that may be multiplexed over signal line 748, as time for preparing and writing data for only a certain number of pixels may fit within the remaining period of $T_{ROW}$.

Figure 9:
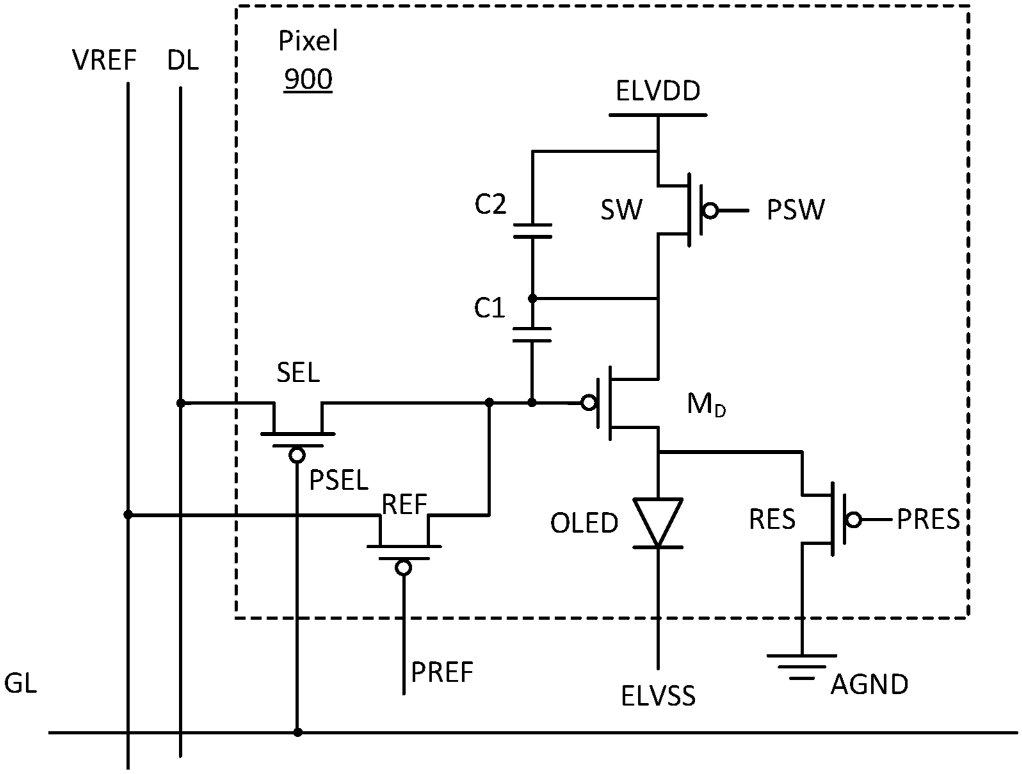
FIG. 9 is a circuit diagram illustrating a pixel with five transistors and two capacitors, according to some embodiments.

FIG. 9 is a circuit diagram illustrating a pixel 900, according to some embodiments. In comparison to the pixel 800 shown in FIG. 8A, the pixel 900 includes an additional switch, the reference voltage switch REF, shown in FIG. 9 as a PMOS transistor, that controls a connection between the gate terminal of the driving transistor $M_D$ and an external reference voltage $V_{REF}$. As such, while the pixel 800 illustrated in FIG. 8A is a pixel with four transistors and two capacitors (referred to as a 4T2C design), the pixel 900 shown in FIG. 9 has five transistors and two capacitors (which may be referred to as a 5T2C design). In some embodiments (not shown), the pixel circuit may be configured to include only a single capacitor (e.g., only capacitor C1), thus having a five transistor, one capacitor (5T1C) design, wherein the capacitor C1 is charged by the data line DL when the SEL switch is turned on during data writing, and during emission, the driving transistor $M_D$ generate current in its drain based on voltage stored by the storage capacitor C1.

The pixel 900 shown in FIG. 9 divides the functionality of the selection switch SEL of the pixel 800 into two different switches, a data selection switch SEL coupled to the data line of the pixel and configured to selectively couple the gate of the driving transistor $M_D$ to the data line, and the reference voltage switch REF configured to selectively couple the gate of the driving transistor $M_D$ to the external reference voltage. In addition, the external reference voltage $V_{REF}$ is provided via a separate line, instead of on the data line for each pixel. For example, the external reference voltage $V_{REF}$ may be provided via a reference voltage line connected to each pixel of the display unit. By decoupling how pixel data and the external reference voltage are provided to the gate of the driving transistor $M_D$ as shown in FIG. 9, the data line for each pixel (e.g., data lines DL1 through DL4) does not toggle between the external reference voltage $V_{REF}$ and the pixel data value $V_{SIG}$ to be provided to the pixel of a particular row. As such, the frame period $T_{FRAME}$ for the display unit can be reduced, as the reset and compensation periods $T_{init}$ and $T_{COMP}$ for pixels of a given row n may be performed in parallel with the data preparation and writing periods $T_P$ and $T_W$ of a previous row of the display unit (e.g., row (n−1)).

Figure 10A:
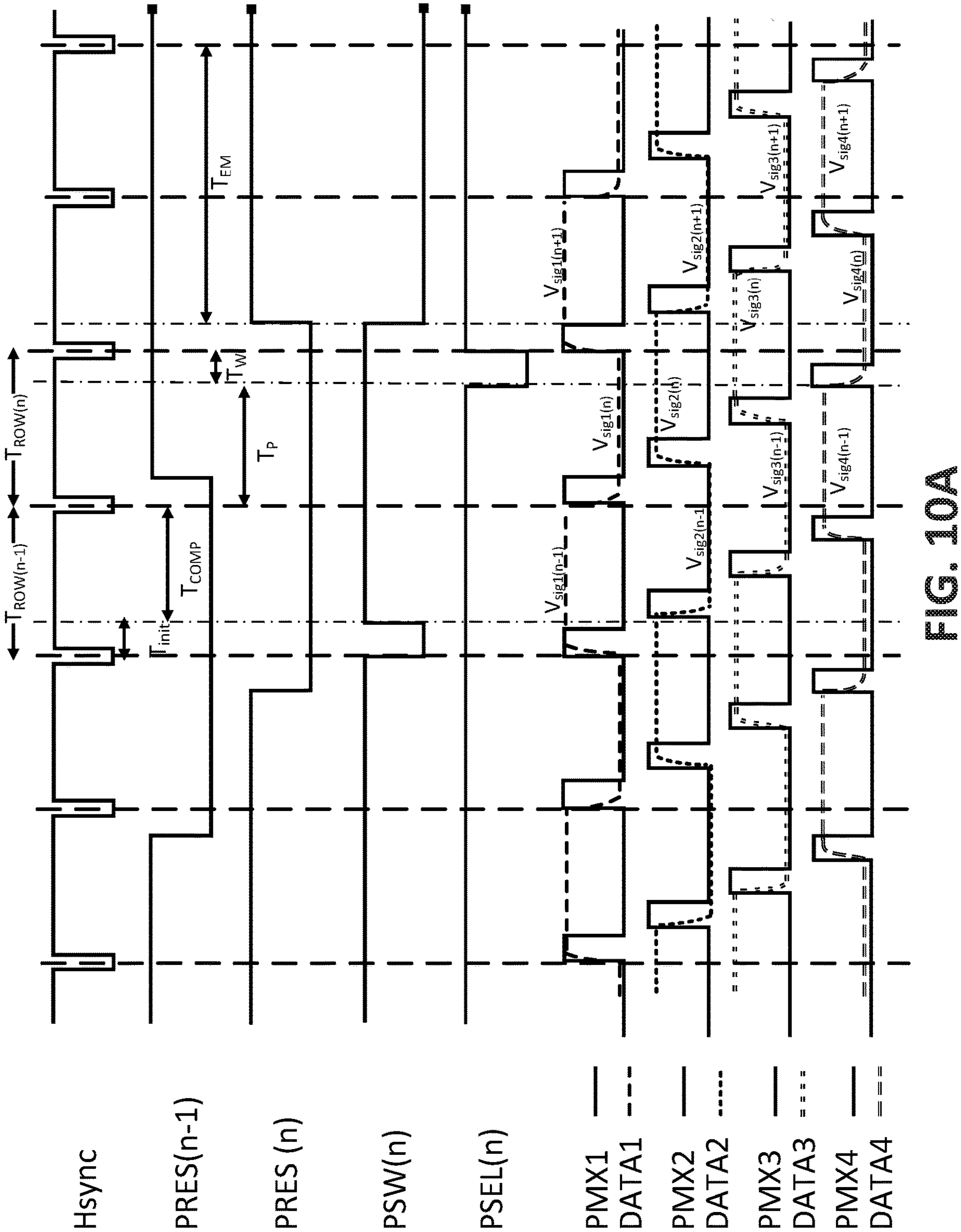
FIG. 10A is a timing diagram of signals for operating the pixel of FIG. 9, according to one embodiment.

FIG. 10A is a timing diagram of signals for operating the pixel 900, according to one embodiment. In the example of FIG. 10A, similar to that of FIG. 8B, a set of pixels, corresponding to four columns of pixels (e.g., columns of pixels 712, 722, 732, and 742), are connected to demultiplexer 716 via respective data lines DL1, DL2, DL3, and DL4. PSW(n) illustrates a timing signal for turning on or off the emission switches SW in pixels of the same row n of the display unit (e.g., pixels 712A, 722A, 732A, and 742A of pixel row A), PRES(n) illustrates a timing signal for turning on or off the reset switches RES in the same row n of pixels, and PSEL(n) illustrate a timing signal for turning on or off selection switches SEL in the same row n of pixels, when the emission switches SW, reset switches RES, and selection switches SEL are embodied as PMOS transistors (e.g., as illustrated in FIG. 9). In addition, the signal PRES(n−1) is a timing signal for turning on or off the reset switches RES in a previous row of the display (e.g., row (n−1)). In some embodiments where row n corresponds to a first row of the display unit, the display unit may include an extra signal line used to provide the signal PRES(n−1) to be used by the pixels of the row n.

In some embodiments, the reference voltage switch REF for a pixel of a given row n of the display unit is controlled using the reset signal PRES(n−1) provided to the previous row n−1 (or provided through an extra signal line, where row n is a first row of the display unit). In other words, the reference voltage switch REF for pixels of a given row n is turned on and off with the same timing as the reset switch RES for pixels of a previous row n−1. Thus, as shown in FIG. 10A, the reference voltage switch REF is turned on during the initialization period $T_{init}$ and compensation period $T_{COMP}$ for the row n, which overlap in time with the data preparation period $T_P$ and data writing period $T_W$ of the previous row n−1 (during $T_{ROW(n-1)}$, when the data lines, due to not having to provide the external reference voltage $V_{REF}$ to the pixels of row n, are able to be loaded with pixel value data from the source drive to be provided to the pixels of the row n−1). In addition, the reference voltage switch REF is turned off before the data writing period $T_W$ of the row n, which is when the data select switch SEL for the pixel is turned on to couple the data of the driving transistor $M_D$ to its associated data line, e.g., DL1, DL2, DL3, or DL4, to write the pixel data loaded onto the data line, e.g., $V_{SIG1(n)}$, $V_{SIG2(n)}$, $V_{SIG3(n)}$, or $V_{SIG4(n)}$.

Because the initialization and compensation operations for the pixels of the row n are performed in parallel with the data preparation and writing for the pixel of the previous row n−1 (e.g., during $T_{ROW(n-1)}$), the row period $T_{ROW(n)}$ used by the display unit to prepare and write data for the pixel row n of the display unit is greatly reduced in comparison with the design shown in FIGS. 8A and 8B. Thus, by overlapping in time the initialization and threshold compensation for each row with the data preparation and writing for the previous row, the frame rate of display unit is greatly increased. In addition, because the external reference voltage $V_{REF}$ may be lower than the range of voltages corresponding to pixel data signals, by separating the external reference voltage $V_{REF}$ to be provided via a separate line, the peak-to-peak voltage swing of the data lines is reduced, reducing power consumption. For example, in some embodiments, the external reference voltage may be 3V, while range of voltages corresponding to pixel data signals ranges from about 3.3V to about 4.2V.

Figure 10B:
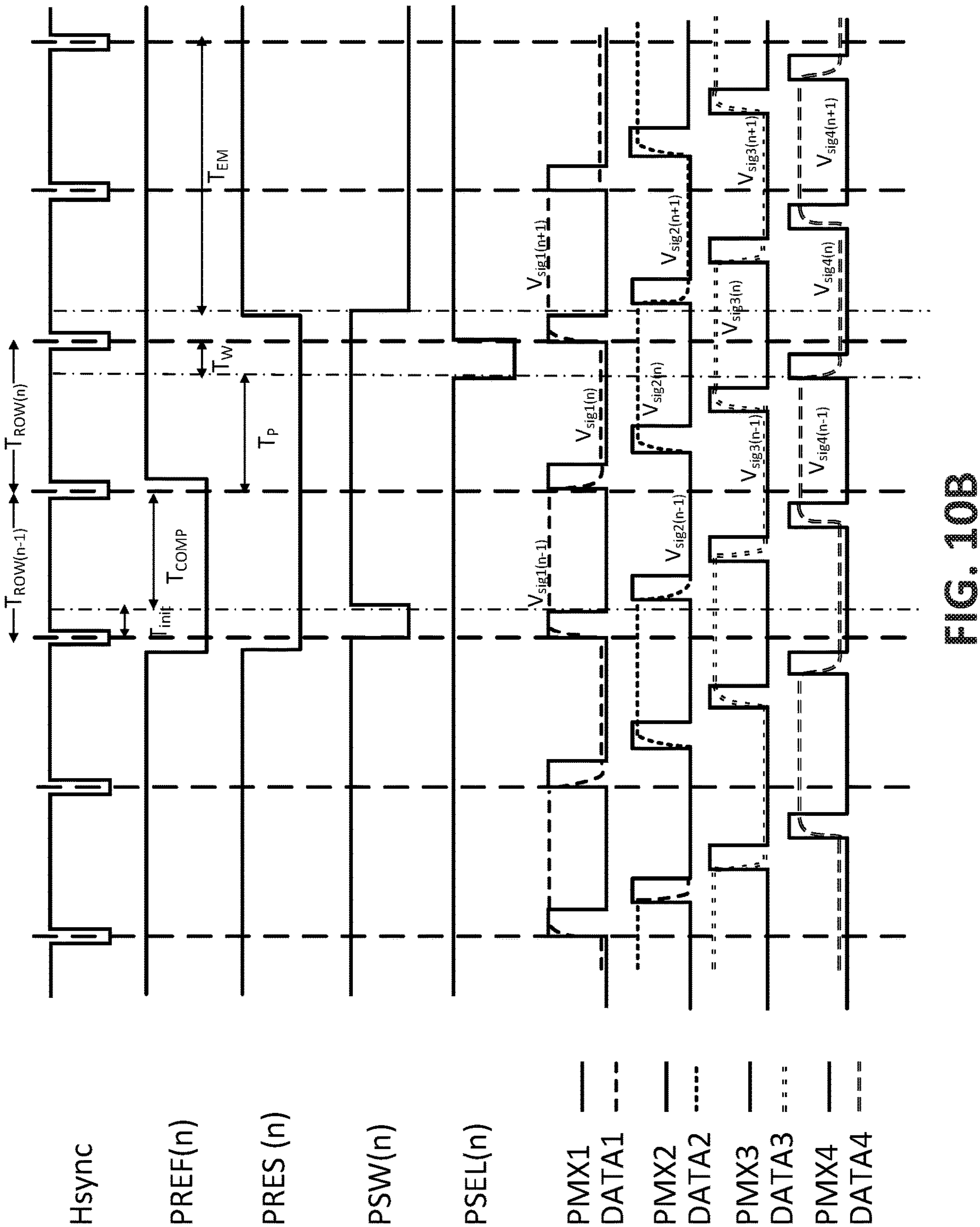
FIG. 10B is a timing diagram of signals for operating the pixel of FIG. 9, according to another embodiment.

FIG. 10B is a timing diagram of signals for operating the pixel 900, according to another embodiment. In the embodiment illustrated in FIG. 10B, the gate of the references voltage switch for a pixel of the row n, instead of being coupled to the signal line providing the reset signal for the previous row of the display (e.g., PRES(n−1)), is coupled to a separate reference voltage signal line for each row, referred to as PREF(n). For example, as shown in FIG. 10A, when the reference voltage switch REF is coupled to the reset signal line for the previous row (PRES(n−1)), the reference voltage switch REF is turned on before the start of the initialization and compensation periods for the pixels of the row n (e.g., over one row period before). On the other hand, as shown in FIG. 10B, where the reference voltage switch REF is controlled via its own reference voltage signal line (PREF(n)), the reference voltage switch REF for each row can be controlled so that the timing at which it is turned on to provide the external reference voltage $V_{REF}$ to the driving transistor gate is more closely aligned with the initialization and compensation periods for the row n (e.g., turned on at or shortly before the start of the initialization period)

Figure 10C:
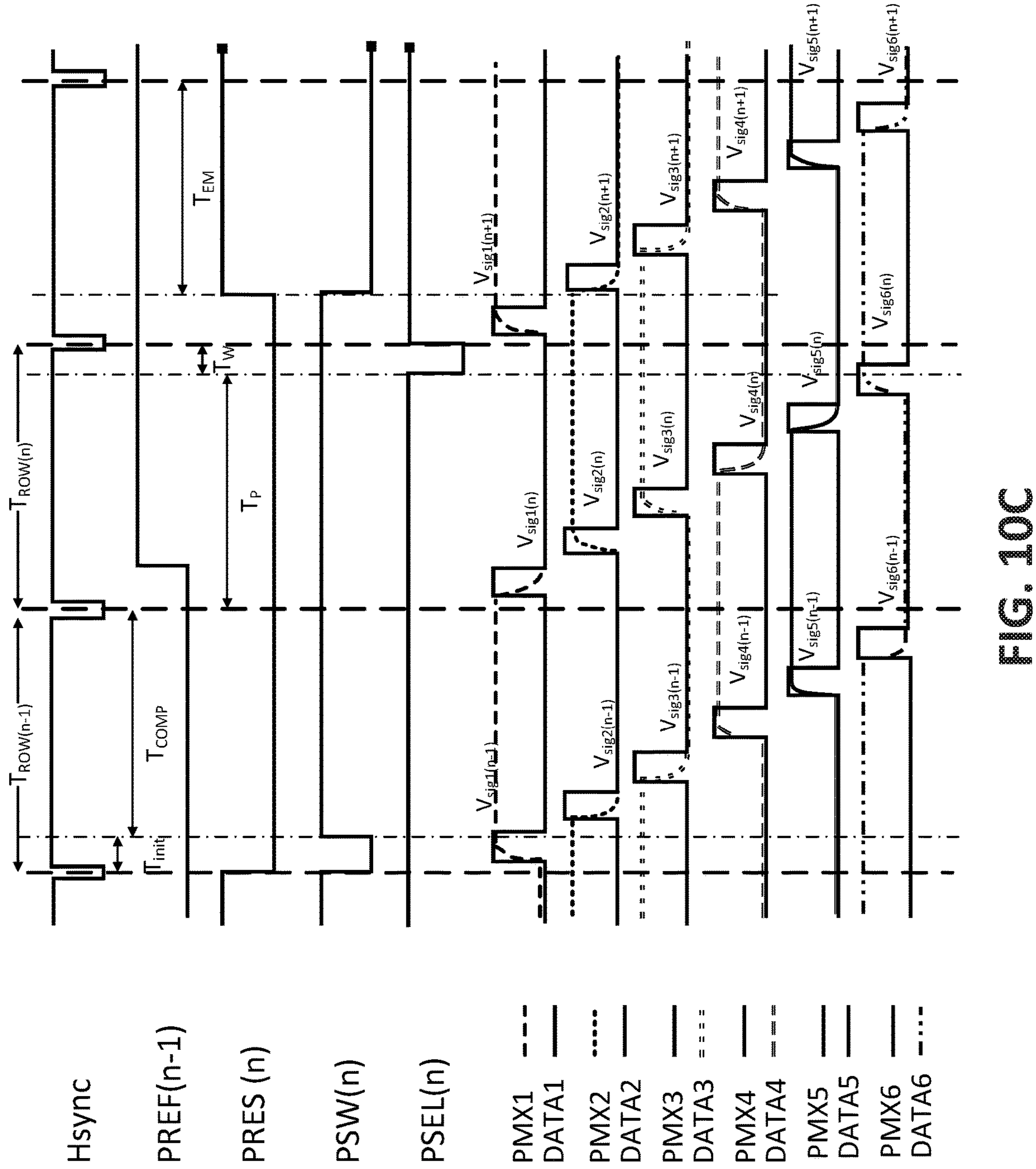
FIG. 10C is a timing diagram of signals for operating the pixel of FIG. 9, according to another embodiment.

FIG. 10C is a timing diagram of signals for operating the pixel 900, according to another embodiment. The timing diagram of FIG. 10C illustrates that because for a given row period $T_{ROW}$, the use of a separate reference voltage switch REF allows for the initialization and compensation periods for a row n of the display to be performed in parallel with the data preparation and writing of a previous row (e.g., row n−1), data preparation and writing for a greater number of data lanes can be performed during the row period $T_{ROW}$. Because the row period $T_{ROW}$ no longer needs to accommodate the compensation period $T_{COMP}$, the portion of the row period $T_{ROW}$ the would have been occupied by the compensation period in embodiments that do not utilize a separate reference voltage switch REF, can instead be used to accommodate charging of additional data lines. For example, FIG. 10C illustrates the row period $T_{ROW}$ accommodating data preparation and writing for six data lines, instead of four data lines in the embodiments illustrated in FIGS. 8B, 10A, and 10B. This allows for an increased number of pixel columns that may be multiplexed over a signal line 748, increasing the number of data lines corresponding to each demultiplexer (e.g., demultiplexer 716). By increasing the number of data lines per demultiplexer, module yield is improved due to a reduced number of bonding pads needed to connect the signal lines 624 of the DDIC 510 to the backplane 520, e.g., due to a smaller number of signal lines, as each signal line provides data for a larger number of pixel columns of the display unit (e.g., via a larger number of data lines per demultiplexer). In addition, the increased number of data lines per multiplexer may reduce a data line toggling frequency, improving power consumption of the display unit. It is understood that the illustrated embodiments showing four data lines per demultiplexer and six data lines per demultiplexer are illustrative, and that in other embodiments, different numbers of data lines may be coupled to each demultiplexer. In some embodiments, the number of data lines per demultiplexer is selected based upon a given row period $T_{row}$, and the data preparation and writing ($T_p$ and $T_w$) for multiple data lines.

Although embodiments are described above with reference to the pixel structures of FIGS. 8A and 9, the same principle may apply to other pixel structures that utilize an external reference voltage for performing threshold compensation, in which the external reference voltage is decoupled from the data lines, and is provided to the gate of the driving transistor separately from the pixel value data provided via the data lines.

Figure 11:
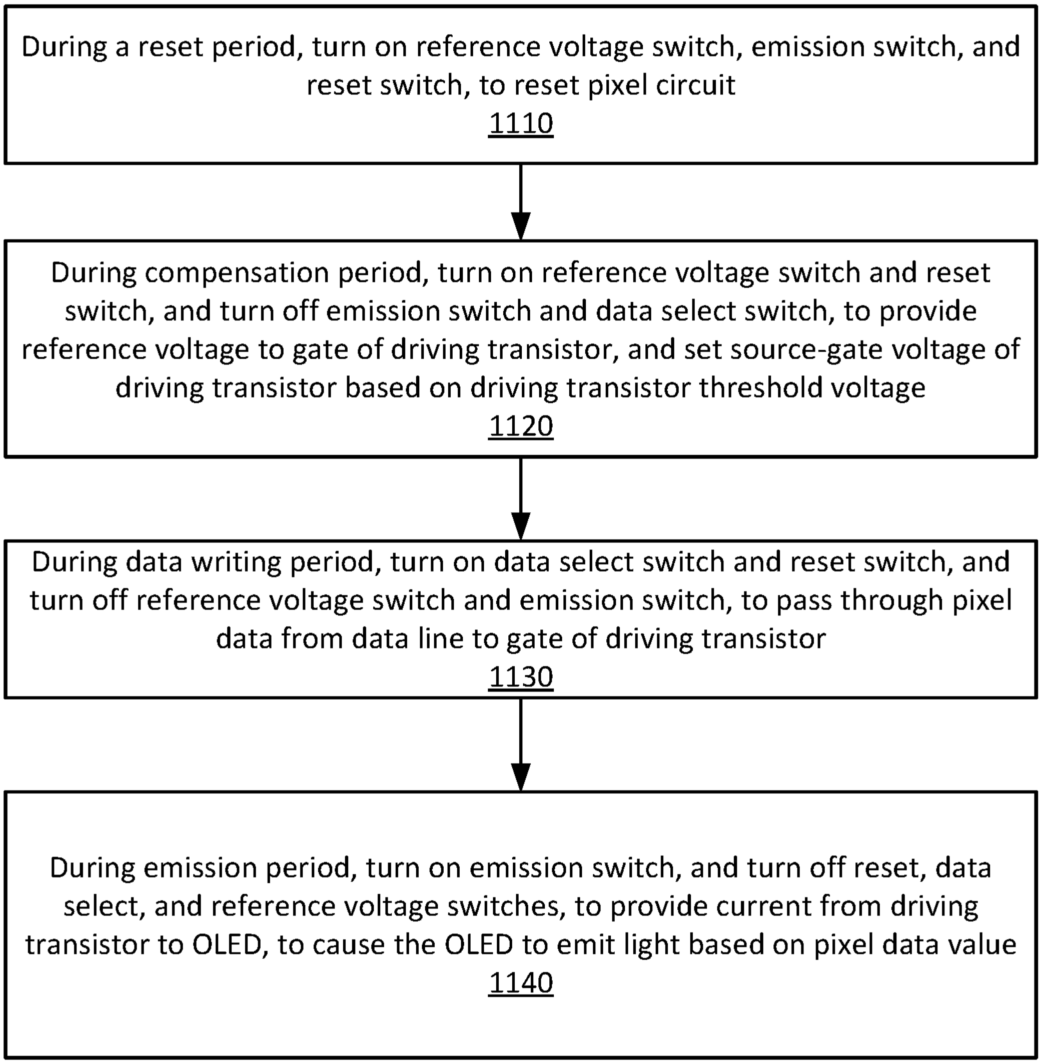
FIG. 11 is a flowchart illustrating an operation of an OLED display device, according to some embodiments.

FIG. 11 is a flowchart illustrating a method of operating a pixel in an OLED display device, according to some embodiments. In some embodiments, the pixel in the OLED display device corresponds to a pixel 900, such as that illustrated in FIG. 9, having five transistors (e.g., a driving transistor, which is controlled using a data select switch, a reference voltage switch, an emission switch, and a reset switch). In some embodiments, the pixel is part of a set of pixel with a same row having respective data lines coupled to a common demultiplexer, where pixel data is loaded onto the data lines and written to each pixel of the set of pixels during a same row period.

In a reset period, a reference voltage switch, emission switch, and reset switch of the pixel are turned on 1110 to reset the pixel. For example, in some embodiments, the pixel is reset via a reset current that flows from a high voltage source through the driving transistor of the pixel to a low voltage source that bypasses the OLED.

In a compensation period, the reference voltage switch and reset switch of the pixel are turned on 1120, while the emission switch and data select switch are turned off, in order to provide the external reference voltage to the gate of the driving transistor, to cause a source-gate voltage of the driving transistor to be set based on the threshold voltage of the driving transistor.

In a data writing period, the data select switch and reset switch of the pixel are turned on 1130, while the reference voltage switch and emission switch are turned off, to pass through pixel data stored on the data line associated with the pixel to the gate of the driving transistor. In some embodiments, the provided pixel data charges a storage capacitor to a voltage based upon a value of the pixel data. In some embodiments, the data writing period follows a data preparation period, during which the demultiplexer sequentially connects the data lines of the set of pixels to a signal line, to charge each data line to a voltage indicative of a pixel signal value for its associated pixel.

In an emission period, the emission switch of the pixel is turned on 1140, while the data selection, reset, and reference voltage switch are turned off, such that the source of the driving transistor is connected to a high voltage source, causing the driving transistor to generate current in its drain based upon the voltage stored in the storage capacitor, based upon the pixel data. The current is provided to the OLED to drive the OLED, causing the OLED to generate light of intensity that corresponds to the amount of current provided by the driving transistor.

In some embodiments, the process illustrated in FIG. 11 is performed in parallel for different sets of pixels of a row of the OLED display. In addition, the process is performed in sequence for each row of the OLED display.

The processes and the sequence of processes as described above with reference to FIG. 11 are merely illustrative. Various other periods/processes may be added or the processes may be performed in a different sequence.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A display device comprising:

a data line;

a gate line intersecting with the data line; and a pixel coupled to the data line and the gate line, the pixel comprising:

an organic light emitting diode (OLED) coupled to a low voltage source;

a data select switch selectively passing through pixel data from the data line responsive to receiving a gate signal from the gate line, the data select switch being turned on during a data writing period for the pixel;

a reference voltage switch selectively passing through a reference voltage responsive to receiving a gate signal from a second gate line, the reference voltage switch being turned on during at least a compensation period for the pixel, wherein the compensation period is before a data preparation period for loading the pixel data for the pixel on the data line;

an emission switch configured to selectively connect to a voltage source higher than the low voltage source, the emission switch being turned on during an emission period for the pixel; and a driving transistor having a drain coupled to the OLED, a gate coupled to the data select switch and the reference voltage switch to receive the reference voltage in the compensation period and the pixel data in the data writing period, and a source coupled to the emission switch.

2. The display device of claim 1, wherein the display device comprises a plurality of rows of pixels, and wherein the compensation period for the pixel on a row of the plurality of rows of pixels overlaps in time with a data writing period of a pixel of a previous row of the display device.

3. The display device of claim 1, wherein the pixel further comprises a reset switch coupled to the drain of the driving transistor to disable current flow in the OLED when turned on during the compensation period and the data writing period, and to enable current flow in the OLED when turned off during the emission period.

4. The display device of claim 3, wherein the reset switch is controlled via a reset signal, and wherein the second gate line is configured to receive a reset signal of a previous row of the display device.

5. The display device of claim 1, wherein the pixel further comprises a first capacitor between the gate of the driving transistor and a source of the driving transistor.

6. The display device of claim 5, wherein the pixel further comprises a second capacitor coupled between the voltage source that is higher than the low voltage source and the source of the driving transistor in parallel with the emission switch.

7. The display device of claim 1, wherein the data select switch, reference voltage switch, emission switch, and driving transistor are P-channel metal-oxide-semiconductor (PMOS) transistors.

8. The display device of claim 1, further comprising a demultiplexer connected to a source drive circuit, the demultiplexer configured to sequentially couple a plurality of data lines including the data line to a signal line from the source drive circuit during a preparation period prior to the data writing period.

9. The display device of claim 8, wherein a number of columns of pixels coupled to the demultiplexer is more than four.

10. The display device of claim 1, wherein the pixel is formed on a silicon substrate.

11. A method of operating a pixel in a display device, comprising:

in a compensation period, turning on a reference voltage switch of the pixel to pass through a reference voltage to a gate of a driving transistor in the pixel responsive to receiving a gate signal from a reference gate line, to set a source-gate voltage of the driving transistor based on a threshold voltage of the driving transistor;

in a data writing period subsequent to the compensation period, turning on a data select switch of the pixel to pass through pixel data from a data line to the gate of the driving transistor in the pixel responsive to receiving a gate signal from a gate line intersecting with the data line, to set the source-gate voltage of the driving transistor based on the pixel data, wherein a data preparation period for loading the pixel data for the pixel on the data line is after the compensation period; and in an emission period subsequent to the data writing period, turning off the data select switch but turning on an emission switch between a voltage source and a source of the driving transistor, to provide current from a drain of the driving transistor to an organic light emitting diode (OLED) based upon the pixel data, to cause the OLED to emit light based upon the pixel data.

12. The method of claim 11, wherein the display device comprises a plurality of rows of pixels, and wherein the compensation period for the pixel on a row of the plurality of rows of pixels overlaps in time with a data writing period of a pixel of a previous row of the display device.

13. The method of claim 11, further comprising turning on a reset switch located between a drain of the driving transistor and a low voltage source in the compensation period and the data writing period, and turning off the reset switch in the emission period.

14. The method of claim 13, wherein the reference gate line is coupled to a gate of a reset switch of a pixel of a previous row of the display device.

15. The method of claim 11, further comprising storing the source-gate voltage in a first capacitor during the compensation period and the data writing period, wherein the current during the emission period is a function of the stored source-gate voltage.

16. The method of claim 11, wherein the data select switch, reference voltage switch, emission switch, and driving transistor are P-channel metal-oxide-semiconductor (PMOS) transistors.

17. The method of claim 11, further comprising sequentially coupling, by a demultiplexer, a plurality of data lines including the data line to a signal line from a source driver circuit in a preparation period prior to the data writing period.

18. The method of claim 11, wherein the pixel is formed on a silicon substrate.

19. A pixel in a display device, comprising:

an organic light emitting diode (OLED) coupled to a low voltage source;

a data select switch selectively passing through pixel data from a data line coupled to the pixel responsive to receiving a gate signal from a gate line coupled to the pixel, the data select switch being turned on during a data writing period for the pixel;

a reference voltage switch selectively passing through a reference voltage responsive to receiving a gate signal from a second gate line, the reference voltage switch being turned on during at least a compensation period for the pixel, wherein the compensation period is before a data preparation period for loading the pixel data for the pixel on the data line;

an emission switch configured to selectively connect to a voltage source higher than the low voltage source, the emission switch being turned on during an emission period for the pixel; and a driving transistor having a drain coupled to the OLED, a gate coupled to the data select switch and the reference voltage switch to receive the reference voltage in the compensation period and the pixel data in the data writing period, and a source coupled to the emission switch.

20. The pixel of claim 19, wherein the display device comprises a plurality of rows of pixels, and wherein the compensation period for the pixel on a row of the plurality of rows of pixels overlaps in time with a data writing period of a pixel of a previous row of the display device.

* * * * *